United States Patent Office 3,366,466
Patented Jan. 30, 1968

3,366,466
REFRACTORY CERAMIC-TO-METAL SEAL
Alfred Milch, Teaneck, N.J., and Joseph J. Lalak, Briarcliff Manor, and Richard H. Ahlert, Spring Valley, N.Y., assignors to North American Philips Co., Inc., New York, N.Y., a corporation of Delaware
No Drawing. Continuation-in-part of application Ser. No. 364,739, May 4, 1964. This application Oct. 7, 1966, Ser. No. 584,966
10 Claims. (Cl. 29—195)

ABSTRACT OF THE DISCLOSURE

A ceramic-to-metal seal in which the reactive refractory metals, tantalum and niobium, are joined to a metallized ceramic by means of certain special alloys containing tantalum and niobium.

The application is a continuation-in part of application Ser. No. 364,739, filed May 4, 1964 now Patent No. 3,340,025.

The invention relates to refractory hermetic ceramic-to-metal seals and in particular to seals between refractory ceramics such as alumina, spinels, magnesia, synthetic sapphire, and the like and tantalum or niobium. The invention also relates to a method of manufacturing such seals.

In the copending application above referred to we have disclosed refractory ceramic-to-metal seals obtained by forming on the ceramic a layer of a spongy refractory metal such as molybdenum, tungsten, and mixtures of these metals which is then covered with a metal which is capable of wetting the refractory metal sponge. Such wetting metals are rhenium, alloys of molybdenum and ruthenium and alloys of rhodium and molybdenum of composition as disclosed in the copending application. The spongy refactory metal layer covered with the wetting metal is then brazed to a refractory metal using, in the case of rhenium as a wetting metal conventional braze metals, and in the case of the alloy of molybdenum and ruthenium, or the alloy or rhodium and molybdenum a refractory brazing metal whose melting point does not exceed that of the wetting metal.

Although it is disclosed in that application that tantalum and niobium may be sealed to the ceramic in this manner provided precautions are taken to employ a vacuum or inert atmosphere during brazing, such seals are not always hermetic. In order to obtain a highly-refractory hermetic seal, we have found that special brazing alloys, which are not disclosed as such in that application, must be employed. More particularly, we have found, in order to obtain a hermetic seal when brazing the metallized ceramic to niobium or tantalum, it is essential to employ as a braze material a refractory alloy which does not form low melting phases with the wetting metal and/or the tantalum or niobium member being sealed.

Since both tantalum and nobium have coefficients of thermal expansion very close to that of alumina, seals made in accordance with the invention will experience minimum mechanical stress during change in temperature. Thus where an extremely high degree of thermal stability is required, seals made according to this invention acquire a high degree of technological importance.

The following examples are illustrative of the invention which is defined in the appended claims.

An alumina cylinder was prepared for brazing according to the teachings of our copending application Ser. No. 364,739, filed May 4, 1964, by applying a layer of MoO₃ suspended in distilled water to an alumina cylinder, allowing this layer to dry, and heating the so-coated alumina cylinder in wet hydrogen to reduce the MoO₃ and sinter the resulting molybdenum in order to obtain a tightly adherent layer of molybdenum sponge on the alumina. A 0.005" thick tantalum disc was hermetically brazed to the metallized alumina with an alloy of Ta-Rh in vacuum A eutectic mixture of Ta-Rh with a melting point of 1740° C. at 31.5 weight percent of Rh was employed as both wetting and brazing agent. The above braze has been re-heated to 1550° C., the melting point of palladium, and remains vacuum tight. The permissible composition range of the wetting and brazing alloy compatible with the softening point of high alumina ceramics is 19 weight percent to 52 weight percent Rh.

An alumina a niobium seal was accomplished in a slightly different manner. A cleaned high alumina tube was coated with a suspension of MoO₃ in distilled water and allowed to air dry. A second layer consisting of RuO₂ and MoO₃, corresponding to the eutectic mixture of Ru and Mo, suspended in nitrocellulose amyl acetate binder was painted over this layer. Firing in a wet hydrogen atmosphere reduced the oxides, sintered the essentially pure first layer of Mo to form a tightly adherent spongy molybdenum layer and at the same time melted the Ru-Mo overlayer at the eutectic temperature of 1950° C. The thus metallized and wetted alumina was hermetically brazed to a 0.005" disc of niobium in vacuum using a eutectic mixture of 63 weight percent iridium and 37 weight percent niobium (M.P. 1840° C.) as the brazing agent. The permissible composition range of the brazing alloy compatible with the softening point of high alumina ceramics is 53 weight percent Ir to 71 weight percent Ir. The above ceramic-to-metal braze has been re-heated in vacuum to 1773° C., the melting point of platinum, and remains vacuum tight.

Another braze alloy that has been used to seal alumina to niobium is Rh-Nb. The initial metallizing of alumina tube was done as described above. Since rhodium was a component of the braze material, we choose to employ an alloy of Rh-Mo as the wetting agent inserted of Ru-Mo. The wetting agent employed was the eutectic mixture of Rh and Mo which was melted into the underlying Mo sponge at 1945° C. A niobium disc was then brazed in vacuum with a eutectic mixture of Rh-Nb having 50 weight percent Rh and melting at 1500° C. The permissible composition range of the brazing alloy compatible with the softening point of high alumina ceramics is 20% to 100% Rh by weight.

It appears that in order to obtain an extremely refractory hermetic seal between tantalum or niobium and a refractory ceramic such as alumina, it is essential to employ a refractory brazing alloy containing tantalum or niobium. We wish to point out in this regard, however, that when brazing alumina metallized by a porous metal layer with a braze material containing niobium, it is preferable that the wetting agent be melted into the pores of the metallizing layer. If this is not done, the resulting bond is much less reliable with respect to temperature recycling as shown by the following experiment:

Two alumina tubes were metallized with a spongy molybdenum layer, rendered wettable by Rh-Mo, and brazed to niobium discs with Rh-Nb as described above. In the case of a tube A the Rh-Mo was melted into the sponge at 1945° C.; in the case of tube B the Rh-Mo was heated in similar manner, but only to 1750° C. so that no melting occurred. After brazing, tube A was recycled to 1235° C., 1340° C., 1400° C., 1450° C. and 1500° C. The brazed joint was tested after each temperature cycling and found to be vacuum tight. Tube B, in which the Rh-Mo was not melted was vacuum tight after recycling to 1235° C. but failed upon recycling to 1340° C.

Thus, in order to prevent attack of the ceramic when niobium is used, we have found it necessary to employ as a wetting metal one which also serves as a coating on the metallized surface of the ceramic preventing destructive attack by the niobium bearing materials, i.e., the braze materials. Furthermore, we have found that unless the wetting material is melted into the pores the brazing operation is more difficult to perform and the percentage of failure is higher.

The term "inert" atmosphere is defined to mean herein and in the claims, vacuum or gaseous atmospheres which do not react or substantially do not react destructively with any of the metals herein disclosed.

It should also be understood that wherever the terms "tantalum" and "niobium" are referred to herein, these terms shall not only include the essentially pure elements but also alloys and compositions thereof in which either of those elements is the predominant constituent thereof.

While the invention has been described with reference to particular embodiments and applications thereof, other modifications will be apparent to those skilled in the art without departing from the spirit and scope of the invention which is defined in the appended claims.

What is claimed:

1. A refractory hermetic metal-to-ceramic seal comprising a refractory ceramic body selected from the group consisting of $Al_2O_3$, MgO, spinel and synthetic sapphire having thereon an adherent layer of a spongy refractory metal selected from the group consisting of molybdenum, tungsten, and mixtures thereof, said spongy layer being completely covered and the pores thereof filled with a wetting metal selected from the group consisting of Ta-Rh alloys, Rh-Mo alloys and Mo-Ru alloys, a refractory brazing metal alloy selected from the group consisting of tantalum alloys and niobium alloys, said alloys having a melting point not higher than that of the wetting metal and lower than melting points of bodies joined thereby, and a body of a refractory metal selected from the group consisting of tantalum and niobium hermetically sealed to the coated metallized layer on the ceramic by the refractory brazing metal.

2. A refractory hermetic ceramic-to-metal seal as claimed in claim 1, in which the refractory metal to which the metallized ceramic is sealed in tantalum and the wetting and brazing metal is an alloy of tantalum and rhodium.

3. A refractory hermetic ceramic-to-metal seal as claimed in claim 2, in which the wetting and brazing alloy consists of between 19 weight percent and 52 weight percent of rhodium and the balance tantalum.

4. A refractory hermetic ceramic-to-metal seal as claimed in claim 3, in which the wetting and brazing alloy is a eutectic mixture of tantalum and rhodium consisting of 31.5 weight percent rhodium and 68.5 weight percent tantalum.

5. A refractory hermetic ceramic-to-metal seal as claimed in claim 1, in which the body of refractory metal is niobium, the component which wets and fills the spongy metal is an alloy of ruthenium and molybdenum, and the brazing metal is an alloy of iridium and niobium.

6. A refractory hermetic ceramic-to-metal seal as claimed in claim 5, wherein the brazing alloy consists of between 53 and 71 weight percent of iridium and the balance niobium.

7. A refractory hermetic ceramic-to-metal seal as claimed in claim 5, in which the brazing metal is a eutectic alloy of 63 weight percent of iridium and 37 weight percent of niobium.

8. A refractory hermetic ceramic-to-metal seal as claimed in claim 1, in which the body of refractory metal is niobium, the component which wets and fills the spongy metal layer is an alloy of rhodium and molybdenum and the brazing metal is an alloy of rhodium and niobium.

9. A refractory hermetic ceramic-to-metal seal as claimed in claim 8, in which the brazing alloy consists essentially of 20 to 100 weight percent of rhodium and the balance niobium.

10. A refractory hermetic ceramic-to-metal seal as claimed in claim 8, in which the brazing metal is a eutectic alloy of rhodium and niobium consisting of 50 weight percent of rhodium and 50 weight percent of niobium.

References Cited

UNITED STATES PATENTS

| | | | |
|---|---|---|---|
| 2,776,472 | 1/1957 | Mesick | 29—195 XR |
| 2,844,868 | 7/1958 | Cline | 29—198 XR |
| 2,996,401 | 8/1961 | Welch. | |
| 3,023,492 | 3/1962 | Bristow | 29—195 |
| 3,024,522 | 3/1962 | Caccioti | 29—195 |

HYLAND BIZOT, *Primary Examiner.*